A. J. GRAY AND W. HEBERN.
AUTOMOBILE LOCK.
APPLICATION FILED MAR. 29, 1920.
1,383,617.
Patented July 5, 1921.
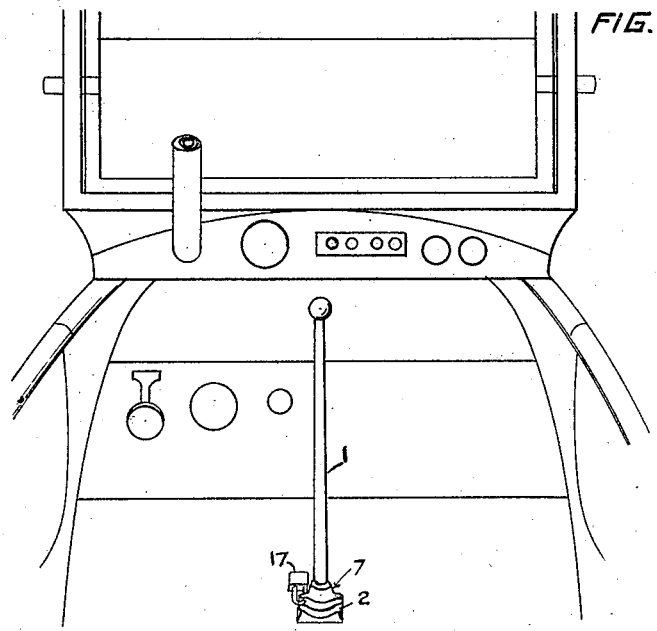
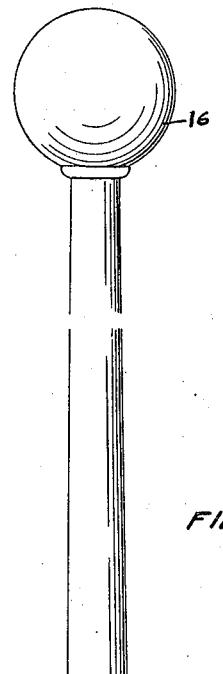
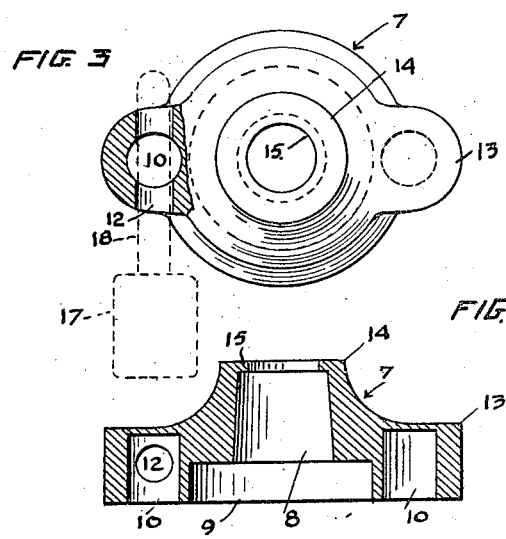
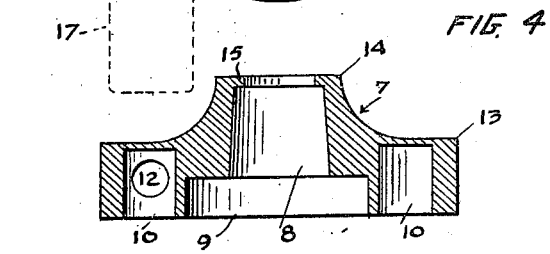
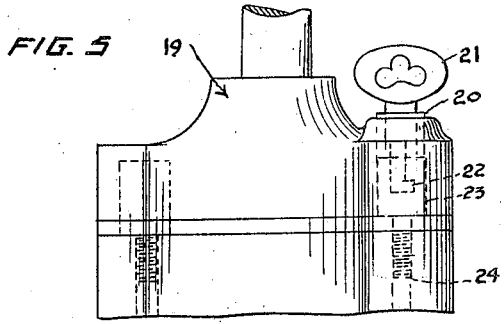
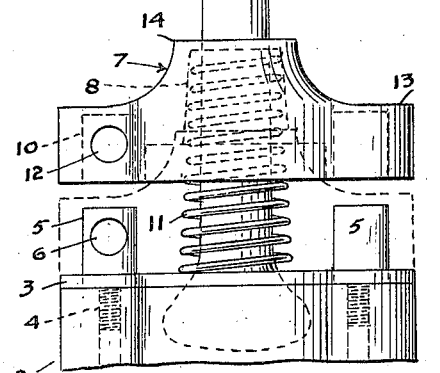
INVENTORS
A. J. GRAY
W. HEBERN
BY Wright & Chun
ATT'YS.

UNITED STATES PATENT OFFICE.

ALBERT J. GRAY AND WILLIAM HEBERN, OF OAKLAND, CALIFORNIA, ASSIGNORS, BY DIRECT AND MESNE ASSIGNMENTS, TO SECURITY AUTO LOCK CO., A COPARTNERSHIP CONSISTING OF ALBERT J. GRAY, WILLIAM HEBERN, AND DAVID GUILD, JR.

AUTOMOBILE-LOCK.

1,383,617.  Specification of Letters Patent.  Patented July 5, 1921.

Application filed March 29, 1920. Serial No. 369,640.

*To all whom it may concern:*

Be it known that we, ALBERT J. GRAY and WILLIAM HEBERN, citizens of the United States, residing at Oakland, in the county of Alameda and State of California, respectively, have invented new and useful Improvements in Automobile-Locks, of which the following is a specification.

This invention relates to improvements in automobile locks of the type which when locked will render the gear shift lever inoperative.

The primary object of this invention is to provide a relatively simple, inexpensive, easily operable, and reliable locking device for locking the gear shift lever of an automobile against operation in neutral position, whereby an automobile thus locked, cannot be driven off by unauthorized persons and is safeguarded against theft.

The invention possesses other advantages and features, some of which, with the foregoing will be set forth at length in the following description where we shall outline in full, that form of the invention which we have selected for illustration in the drawings accompanying and forming a part of the present specification. In said drawings we have shown one form of the construction of our invention but it is to be understood that we do not limit ourselves to such form, since the invention as expressed in the claims may be embodied in a plurality of forms.

Figure 1 is a fragmentary perspective view of an automobile showing our invention applied to the gear shift lever thereof and in locked position.

Fig. 2 is an enlarged fragmentary side elevation of the gear shift lever and its connection with the floor of the automobile, showing the lock in normal unlocked position in full lines, and as it will appear when locked, in dotted lines.

Fig. 3 is a top plan view of the locking device, part thereof being broken away and in section, showing in dotted lines the manner of inserting the padlock.

Fig. 4 is a vertical sectional view of the locking device.

Fig. 5 is a fragmentary side elevation of a modified form of the invention.

Referring particularly to the drawings, 1 designates the gear shift lever of an automobile, said lever being of the universal movement type, and mounted in the customary manner for such movement in a casting 2. The lever is held in place in the casting by a plate 3 mounted upon the top of the casting. This plate is ordinarily held in place by screws, not shown.

In order to provide for the use of our invention, we remove the screws such as ordinarily used to hold the plate 3 in place and substitute therefor screws 4 having enlarged preferably cylindrical heads, which heads project considerably upwardly from the plate 3 and provide locking lugs 5. One of the lugs 5 is provided with a transverse opening 6 extending therethrough.

We provide a locking member 7 vertically adjustably mounted upon the gear shift lever 1. This member is preferably in the form of a circular relatively thick metal plate provided with a central aperture 8 so as to receive the lever 1. The opening or aperture 8 is enlarged circumferentially at its lower end, as at 9, so as to permit of the movement of the locking member into close contact with the plate 3. On opposite sides of the member or plate 7 are formed openings 10 adapted to receive the lugs 5.

The locking member is normally held in up position, as shown in Fig. 2, out of contact with the lugs 5, by an expansion spring 11. This spring is fitted into the opening 8 and at its lower end rests upon the plate 3. In one side of the member 7, there is provided a transverse opening 12 which registers with the opening 6 through the lug 7 when the locking member is moved into locking position. The member 7 where the openings 10 are provided may be formed so as to provide ears 13 and in order to provide strength, may be also formed with an upwardly extending boss 14 on the upper side thereof, the aperture 8 extending through said boss. In order to retain the spring 11, in the aperture 8, there may be provided an inwardly extending flange 15 at the upper end of said aperture.

The locking member 7 with the spring 8 thereon, may be readily mounted upon the lever 1 by removing the ball handle portion 16 on the upper end of the lever. With the member 7 in position shown in full lines in Fig. 2, the lever 1 may be operated in the ordinary manner without interference. When it is desired to lock the lever in neutral position so that it cannot be operated, all that is necessary is to push downwardly upon the member 7 against the action of the spring 11, until said lugs 5 extend into the openings 10 and the openings 6 and 12 register with one another. Any suitable locking means may be employed to lock the member 7 in place. In this instance, we have shown a padlock 17 provided with an elongated hasp 18. When the openings 6 and 12 are brought into registration, the hasp 18 is inserted through said openings and the member 7 is thus locked in such position that movement of the gear shift lever 1 out of neutral position is prevented.

Referring particularly to Fig. 5, we have shown a locking member 19, which is similar in every respect to the member 7 of the preferred form of the invention. In this form of the invention, the modification consists in the provision of a locking device 20 actuated by a key 21. The locking device 20 includes a bolt 22 which co-acts with the head 23 of one of the screws 24 similar to the screws 4 so as to lock the member 19 in operative position.

We claim:—

1. In an automobile lock, the combination with the gear shift lever of an automobile and a member to which the lower portion of said lever is attached, of a locking member vertically adjustably mounted upon said gear shift lever, means for normally holding said locking member out of locking position, and means independent of and engaged directly with the first-named member for locking said locking member to the first named member to prevent movement of said lever.

2. In combination with the gear shift lever of an automobile and a member to which the lower portion of said lever is attached, of locking lugs mounted upon said member, a locking member adjustably mounted upon said gear shift lever and having openings therein to receive said lugs, a spring normally holding said locking member out of contact with said lugs, and means for locking said locking member against movement with the lugs received in the openings therefor, to prevent movement of said lever.

3. The combination with the gear shift lever of an automobile and a member to which the lower portion of said lever is attached, of locking lugs on said member, a locking member having an opening therethrough which receives the lever, said locking member having openings therein to receive the lugs, means for normally holding the locking member out of contact with said lugs and means for locking said locking member in contact with said lugs.

4. The combination with the gear shift lever of an automobile and a member to which the lower portion of said lever is attached, of locking lugs on said member, a locking member having an opening therethrough which receives the lever, said locking member having opening therein to receive the lugs, means for normally holding the locking member out of contact with said lugs, one of said lugs having an opening therethrough, said locking member having an opening therein registering with the opening in the lug when the locking member receives the lugs in the openings therefor, and a padlock having its hasp inserted through the alined openings.

ALBERT J. GRAY.
WILLIAM HEBERN.